United States Patent [19]

Maher

[11] Patent Number: 5,778,448
[45] Date of Patent: Jul. 14, 1998

[54] ASSEMBLY FOR ATTACHING SUNGLASSES TO A CAP

[76] Inventor: Thomas Henry Maher, 2864 Irving Ave. So., Minneapolis, Minn. 55408

[21] Appl. No.: 854,557

[22] Filed: May 12, 1997

[51] Int. Cl.⁶ ........................................ A42B 1/06
[52] U.S. Cl. .................................................... 2/10
[58] Field of Search ................... 2/10, 12, 13, 453, 2/209.13; 351/155, 158

[56] References Cited

U.S. PATENT DOCUMENTS 5,422,686  6/1995  Kelman et al. .................. 2/10
5,615,413  4/1997  Bower ............................. 2/10
5,621,124  4/1997  Day ................................ 2/10

*Primary Examiner*—Peter Nerbun
*Attorney, Agent, or Firm*—Thomas B. Tate

[57] ABSTRACT

An assembly for removably attaching sunglasses to the bill of a baseball cap. The assembly comprises a flexible main frame bridge which has hinges with teeth, a pair of clamps which grip the bill of the cap and which are adjustable by means of teeth interlocking with the teeth on the hinges, and a clamp which fits into the main frame bridge and allows the sunglasses to be flipped up or down.

1 Claim, 2 Drawing Sheets

ASSEMBLY FOR ATTACHING SUNGLASSES TO A CAP

SUMMARY AND BACKGROUND OF THE INVENTION

People often wear sunglasses and baseball caps while participating in sports or other outdoor activities. When these are separate items, the problem is where to store the sunglasses when they are not needed.

The invention is an assembly which allows the sunglasses to be flipped up and concealed underneath the bill of the cap when not needed. Unlike prior art devices such as U.S. Pat. Nos. 5,471,259 and 5,208,916 which attach to the front of the cap, the present invention attaches to the sides of the bill of the cap.

An advantage of this arrangement is that the assembly is more readily adjustable and can be removed and re-mounted onto any size cap. Another advantage of the invention is that the sunglass lens can be readily removed and replaced. Still another advantage is that the bow can be conformed to different configurations of the bill of the cap.

DESCRIPTION OF THE INVENTION

Figure 1:
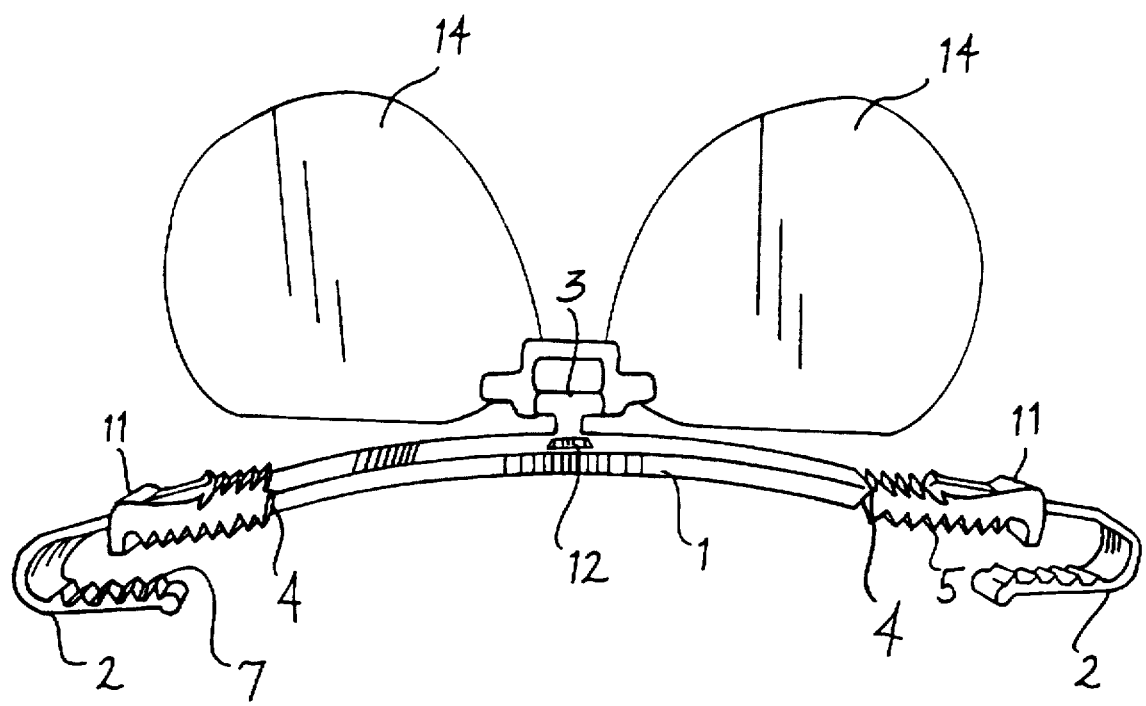
FIG. 1 is a back view.
Figure 2:
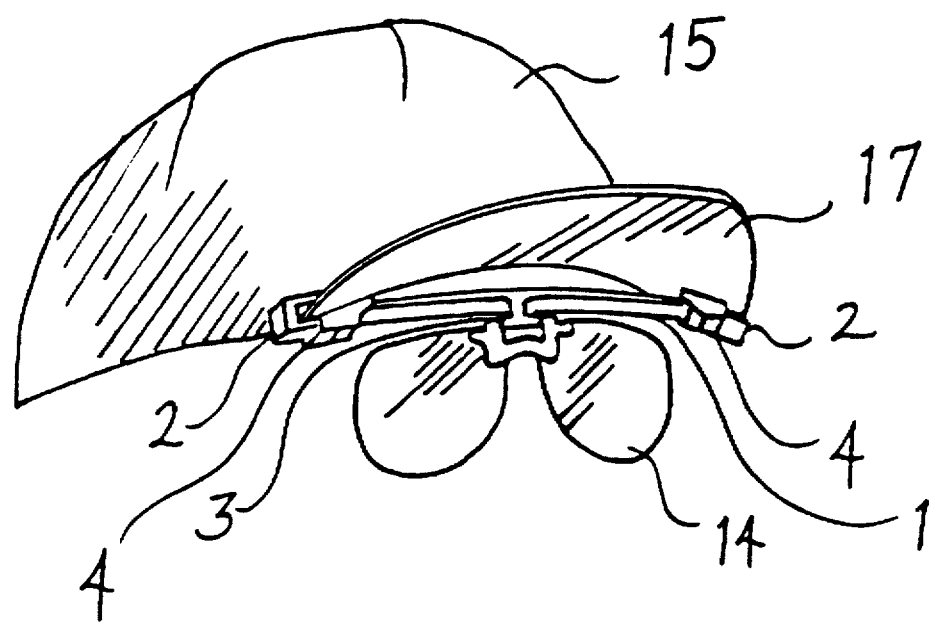
FIG. 2 is a front perspective view of the device attached to a cap.

The invention is an assembly for removably attaching sunglasses to the sides of the bill of a baseball cap. The assembly comprises a main frame bridge or bow 1, a pair of adjustable pressure clamps 2, and a friction-adjustable pressure clamp 3. All parts are preferably made of plastic.

The bow 1 is flexible and is designed to be partially concealed under the bill 17 of the cap 15. At either end of the bow 1 is a hinge 4 which has a plurality of teeth 5 which grasp onto the bill 17 of the cap 15. The hinges 4 allow the bow 1 to conform to different bill configurations (for example, curved bills or straight bills).

The adjustable clamps 2 are generally C-shaped and have a plurality of teeth 7 which grasp onto the bill 17 of the cap 15 and which interlock with the teeth 5 on the hinges 4 in order to allow the clamps 2 to be adjusted to fit cap bills of different widths. The clamps 2 are held onto the bow 1 by means of a retaining bar 11 on each of the hinges 4.

The pressure clamp 3 fits pivotally into openings 12 in the bow 1 and clamps onto the lens 14, which is formed from a single piece of optical material. The clamp 3 allows the lens 14 to be flipped up into a position underneath the bill 17 of the cap 15 when not in use and to be flipped down for use.

I claim:

1. An assembly for removably attaching sunglasses to the sides of the bill of a cap, said assembly comprising:

a bow having at either end thereof a hinge which has teeth which grasp onto said bill of said cap, said hinges allowing said bow to conform to various configurations of said bill, said hinges also having teeth on their opposite surfaces from said teeth which grip said cap bill;

a pair of clamps which mount onto said hinges, said clamps having teeth which grasp onto said bill and also having at least one tooth which interlocks into said teeth of said hinges which are on said opposite surfaces from said teeth which grip said cap bill in various positions, allowing said bow to be adjusted to fit various widths of cap bills;

a pressure clamp which clamps onto a sunglass lens, said clamp pivotally fitting into openings formed into said bow, allowing said lens to be flipped up underneath said bill when not in use and to be flipped down for use.

* * * * *